US007030864B2

(12) United States Patent
Yueh (10) Patent No.: US 7,030,864 B2
(45) Date of Patent: Apr. 18, 2006

(54) PEN BASE MOUSE (76) Inventor: Wen Hsiang Yueh, No. 7-2, Lane 46, Chung Cheng St, Hsinchuang City, Taipei Hsien (TW)

( * ) Notice: Subject to any disclaimer, the term of this patent is extended or adjusted under 35 U.S.C. 154(b) by 267 days.

(21) Appl. No.: 10/265,737

(22) Filed: Oct. 8, 2002

(65) Prior Publication Data
US 2003/0107553 A1 Jun. 12, 2003

(30) Foreign Application Priority Data
Dec. 11, 2001 (TW) ............................. 90221615 U (51) Int. Cl.
*G09G 5/00* (2006.01)
(52) U.S. Cl. .................. 345/179; 345/156; 345/184
(58) Field of Classification Search ........ 345/156–179, 345/184; 178/18.1–18.9, 18.11, 19.1–19.7, 178/20.1–20.4, 18.01–18.09, 19.01–19.07, 178/20.01–20.04; 382/313–314
See application file for complete search history.

(56) References Cited
U.S. PATENT DOCUMENTS
5,298,919 A * 3/1994 Chang ........................ 345/163
5,434,594 A * 7/1995 Martinelli et al. .......... 345/163
6,184,869 B1 * 2/2001 Harding et al. ............. 345/163
6,300,938 B1 * 10/2001 Culver ....................... 345/156
6,486,875 B1 * 11/2002 O'Donnell, Jr. ............ 345/179
6,550,997 B1 * 4/2003 King et al. ................. 345/179
6,686,910 B1 * 2/2004 O'Donnell, Jr. ............ 345/179
2002/0036623 A1 * 3/2002 Kano ......................... 345/179
2002/0084986 A1 * 7/2002 Armstrong ................. 345/163
2002/0118168 A1 * 8/2002 Hinckley et al. ........... 345/163
2003/0197680 A1 * 10/2003 Davenport ................. 345/163

* cited by examiner

*Primary Examiner*—Bipin Shalwala
*Assistant Examiner*—David L. Lewis
(74) *Attorney, Agent, or Firm*—Rosenberg, Klein & Lee (57) ABSTRACT A pen base mouse is constructed to include a penholder holding a circuit board, the circuit board having a wireless transmitter for signal output to a computer, a cursor control unit mounted in one end of the penholder and adapted to control a pointer on a computer screen, and three button units including a left button unit, an intermediate button unit, and a right button unit, each button unit having a roller peripherally extended out of the penholder for rotating and pressing by the user to produce a respective control signal to the circuit board.

13 Claims, 7 Drawing Sheets

PEN BASE MOUSE

BACKGROUND OF THE INVENTION

1. Field of the Invention

The present invention relates to a computer mouse and, more particularly, to a pen base mouse for computer, which is used to control a pointer on a computer screen, and provides the functions of menu selections, command execution, picture scrolling, page turning, and deleting.

2. Description of the Related Art

A variety of mechanical and optical computer mice have been disclosed, and have appeared on the market. A regular mechanical mouse generally comprises a housing holding a rubber ball in the bottom side. When moving the rubber ball across a flat surface, a X-direction roller and a Y-direction roller are rotated, thereby causing a X-direction grid wheel and a Y-direction grid wheel to be rotated between a respective light emitter and a respective light receiver. The X-direction and Y-direction light receivers produce a signal to the CPU indicative of the direction and amount of movement of the mouse. A regular optical mouse comprises two optical transmitter receiver modules arranged at right angles. Each optical transmitter receiver module comprises a photo emitter and a photo receiver. When moving a conventional optical mouse across a grid pad, the grid pad reflects the light of the photo emitter of each optical transmitter receiver module of the optical mouse onto the respective photo receiver, thereby causing the respective photo receiver to produce a corresponding signal. The signals from the photo receivers of the optical transmitter receiver modules are processed by the CPU into a corresponding digital signal indicative of the direction and amount of movement of the optical mouse relative to the grid pad. The aforesaid conventional mechanical and optical mice have a similar operating mode. However, these computer mice are not convenient in use in certain conditions. For example, under a particular software environment, a conventional computer mouse cannot be used to draw lines or write words.

SUMMARY OF THE INVENTION

The present invention has been accomplished under the circumstances in view. It is the main object of the present invention to provide a pen base mouse, which is shaped like a pen for easy use. It is another object of the present invention to provide a pen base mouse, which provides the functions of cursor pointing, menu selections, command execution, picture scrolling, page turning, and deleting. To achieve these and other objects of the present invention, the pen base mouse comprises a tubular penholder, the penholder having a front and a rear end; a circuit board mounted inside the penholder, the circuit board comprising a wireless transmitter; a cursor control unit mounted in the front end of the penholder for moving with the penholder relative to a surface to control a pointer on a computer screen; and three button units adapted to achieve the functions of the "left" button "right" button, and "intermediate" button of a regular optical mouse. The button units each comprise a roller peripherally extended out of the penholder for rotating and pressing by the user to produce a respective signal to the circuit board.

DETAILED DESCRIPTION OF THE PREFERRED EMBODIMENT

Figure 1:
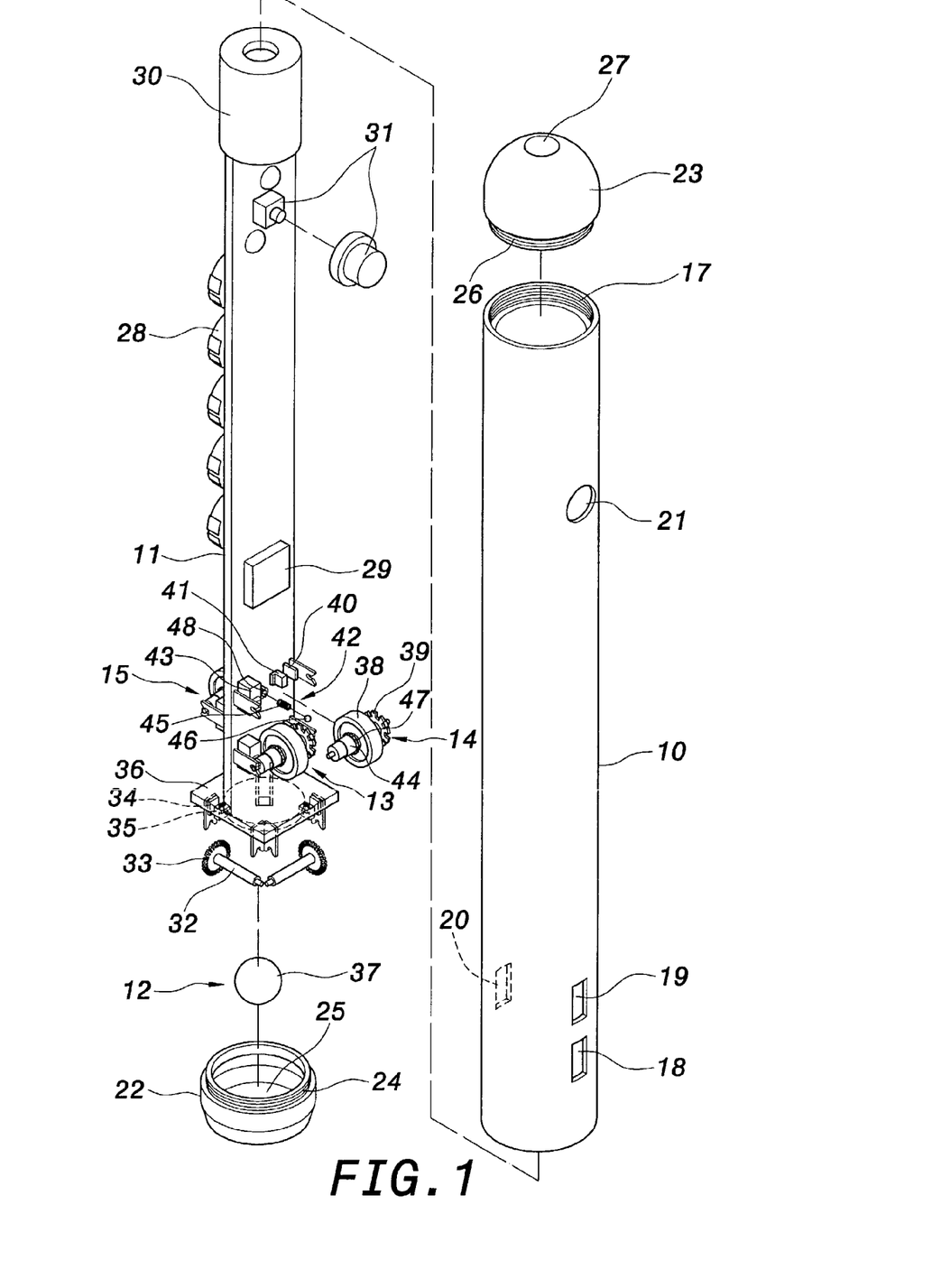
FIG. 1 is an exploded view of a pen base mouse according to the present invention.
Figure 2:
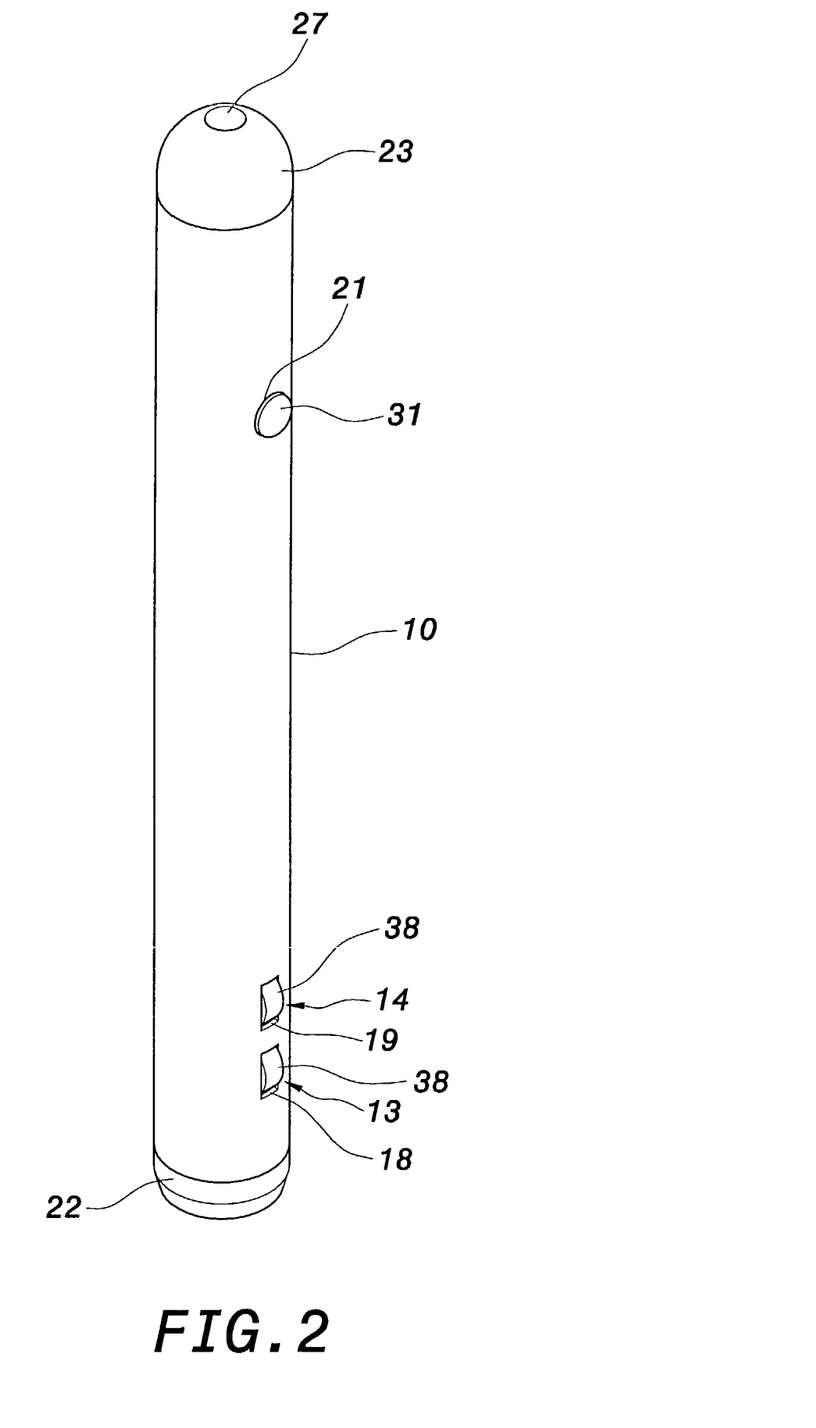
FIG. 2 is an elevational view of the pen base mouse according to the present invention.
Figure 3:
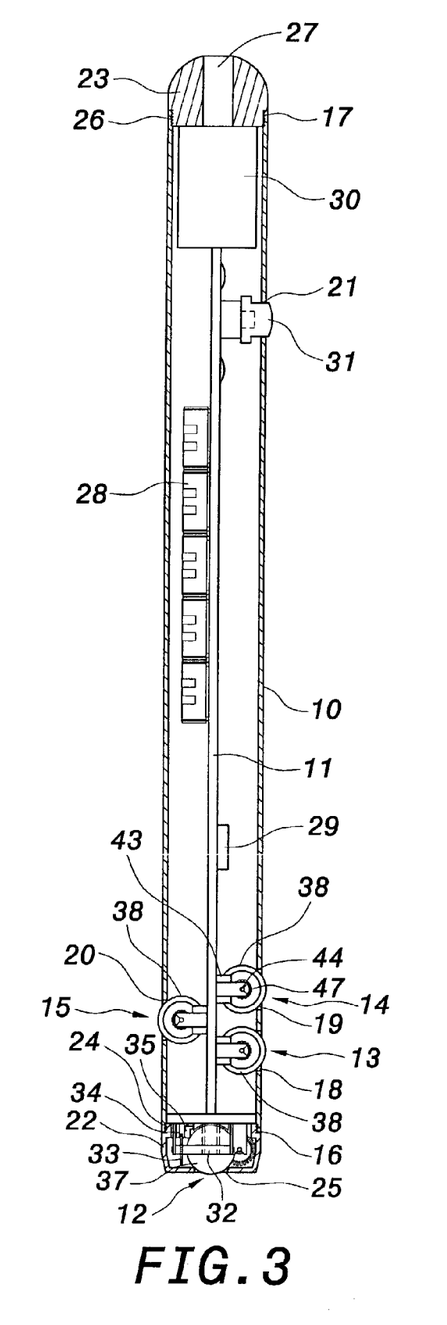
FIG. 3 is a longitudinal view in section of the pen base mouse according to the present invention.

Referring to FIGS. 1, 2, and 3, a pen base mouse in accordance with the present invention is shown comprised of a penholder 10, a circuit board 11, a cursor control unit 12, a left button unit 13, an intermediate button unit 14, a right button unit 15, a front end cap 22, and a rear end cap 23.

The penholder 10 is a tubular rod member having a first inner thread 16 and a second inner thread 17 respectively disposed in the two distal open ends thereof, a first wheel hole 18 disposed adjacent to the front open end, a second wheel hole 19 disposed adjacent and axially aligned with the first wheel hole 18, a third wheel hole 20 disposed opposite to the second wheel hole 19, and a switch hole 21 disposed near the rear end in line with the second wheel hole 19 and the first wheel hole 18. The front end cap 22 comprises an outer thread 24 threaded into the first inner thread 16 of the penholder 10, and a circular center through hole 25. The rear end cap 23 comprises an outer thread 26 threaded into the second inner thread 17 of the penholder 10, and a circular center through hole 27.

The circuit board 11 is an elongated member mounted inside the penholder 10, comprising a set of battery cells 28, which provide the electronic components of the circuit board 11 with the necessary working power, a transmitter 29 adapted to transmit data signal wirelessly, a light source 30 disposed at one end adjacent to the rear end cap 23 and adapted to emit light out of the pen base mouse through the circular center through hole 27 of the rear end cap 23, and a switch 31 extended out of the switch hole 21 for operation by hand to switch on/off the light source 30. The light source 30 can be a laser module adapted to emit a laser beam for pointing things out of a map, blackboard, etc. Alternatively, the light source 30 can be a light emitting diode adapted to emit light for illumination.

The cursor control unit 12 is mounted in the front open end of the penholder 10, comprising a rubber ball 37, X-direction and Y-direction contact rollers 32, X-direction grid and Y-direction grid wheels 33, two optical emitting members 34, and two optical receiving members 35. The ball 37 is supported in the front end cap 22, and peripherally partially exposed outside the circular center through hole 25 of the front end cap 22. The rollers 32 are respectively pivoted to a seat 36 at the front end of the circuit board 11 and arranged at right angles, each having one end disposed in contact with the periphery of the ball 37 and the other end respectively fastened to the grid wheels 33. The optical emitting members 34 and the optical receiving members 35 are respectively fixedly mounted in the seat 36 and electrically connected to the circuit board 11. The optical emitting members 34 according to this embodiment are infrared diodes. The optical receiving members 35 are photosensitive elements. The grid wheels 33 are respectively spaced between the optical emitting members 34 and the optical receiving members 35 such that the optical emitting members 34 are respectively disposed at one side of the grid wheels 33, and the optical receiving members 35 are respectively disposed at the other side of the grid wheels 33.

When the user holding the penholder 10 and moving the ball 37 across a flat surface, the rollers 32 are forced by the ball 37 to rotate the grid wheels 33 in X-direction and Y-direction respectively, and at the same time the optical emitting members 34 emit visible or infrared light toward the optical receiving members 35. When the grid wheel 33 blocked the light from the corresponding optical emitting member 34, the corresponding optical receiving member 35 is off. On the contrary, when light from the optical emitting member 34 passed through the corresponding grip wheel 33, the corresponding optical receiving member 35 is on. Therefore, a pulse signal containing a series of high and low potentials is produced when moving the ball 37 across a flat surface. The pulse signal is then processed by the CPU into a digital signal indicative of the direction and amount of the movement of the ball 37.

The left button unit 13, the intermediate button unit 14 and the right button unit 15 have different functions and definitions, however they are identical in structure. Each button unit comprises a roller 38, a grid wheel 39, an optical emitting member 40, an optical receiving member 41, a compressible support 42, and a switch 43. The roller 38 is fixedly mounted on a shaft 44, which is vertically movably coupled to the circuit board 11. The left button unit 13, the intermediate button unit 14 and the right button unit 15 are mounted in the penholder 10, keeping the respective rollers 38 respectively partially extended out of the wheel holes 18, 19, and 20. Therefore, the user can rotate the rollers 38 and press the rollers 38 downwards with the fingers. The grid wheel 39 of each button unit is fixedly mounted on one end of the corresponding shaft 44 and spaced between the optical emitting member 40 and optical receiving member 41 of the respective button unit. Therefore, the optical emitting member 40 and optical receiving member 41 of each button unit are respectively disposed at two opposite sides of the grid wheel 39 of the respective button unit. The optical emitting members 40 and optical receiving members 41 of the button units 13, 14, and 15 are infrared diodes and photosensitive elements respectively electrically connected to the circuit board 11 so that signal is smoothly transmitted to the circuit board 11.

When the user holding the penholder 10 with the hand and rotating the roller 38 of one button unit, the grid wheel 39 and shaft 44 of the respective button unit are rotated, and at the same time the optical emitting member 40 of the respective button unit emits visible or infrared light toward the corresponding optical receiving member 41. When the grid wheel 39 blocked the light from the corresponding optical emitting member 40, the corresponding optical receiving member 41 is off. On the contrary, when light from the optical emitting member 40 passed through the corresponding grip wheel 39, the corresponding optical receiving member 41 is on. Therefore, a pulse signal containing a series of high and low potentials is produced when rotating the roller 38 of one button unit. The pulse signal is then processed by the CPU and applied software to achieve the functions of picture scrolling, page turning, or deleting.

The compressible support 42 of each button unit is comprised of a compression spring 45 and a positioning ball 46. Further, the shaft 44 of each button unit has a serrated portion 47 extended around the periphery. The compression spring 45 is mounted in a fixed hollow spring holder 48 at the circuit board 11. The positioning ball 46 is supported on the compression spring 45, and forced by the compression spring 45 into engagement with the serrated portion 47 of the shaft 44 of the respective button unit. When rotating the roller 38, the serrated portion 47 of the shaft 44 is moved relative to the positioning ball 46. When one tooth of the serrated portion 47 (the serrated portion 47 is formed of a series of teeth) moved over the positioning ball 46, a sound is produced. The switch 43 is mounted in the circuit board 11 corresponding to the shaft 44 of the respective button unit. When the user pressed the roller 38, the corresponding shaft 44 is lowered with the roller 38 to trigger the switch 43 of the respective button unit, thereby causing the switch 43 to produce signal to the CPU, thereby causing the CPU to make menu selections or run a program. According to the present preferred embodiment, the left button unit 13 is adapted to make menu selections; the right button unit 15 is adapted to display quick menu; and the intermediate button unit 14 is adapted to set functions.

Figure 4:
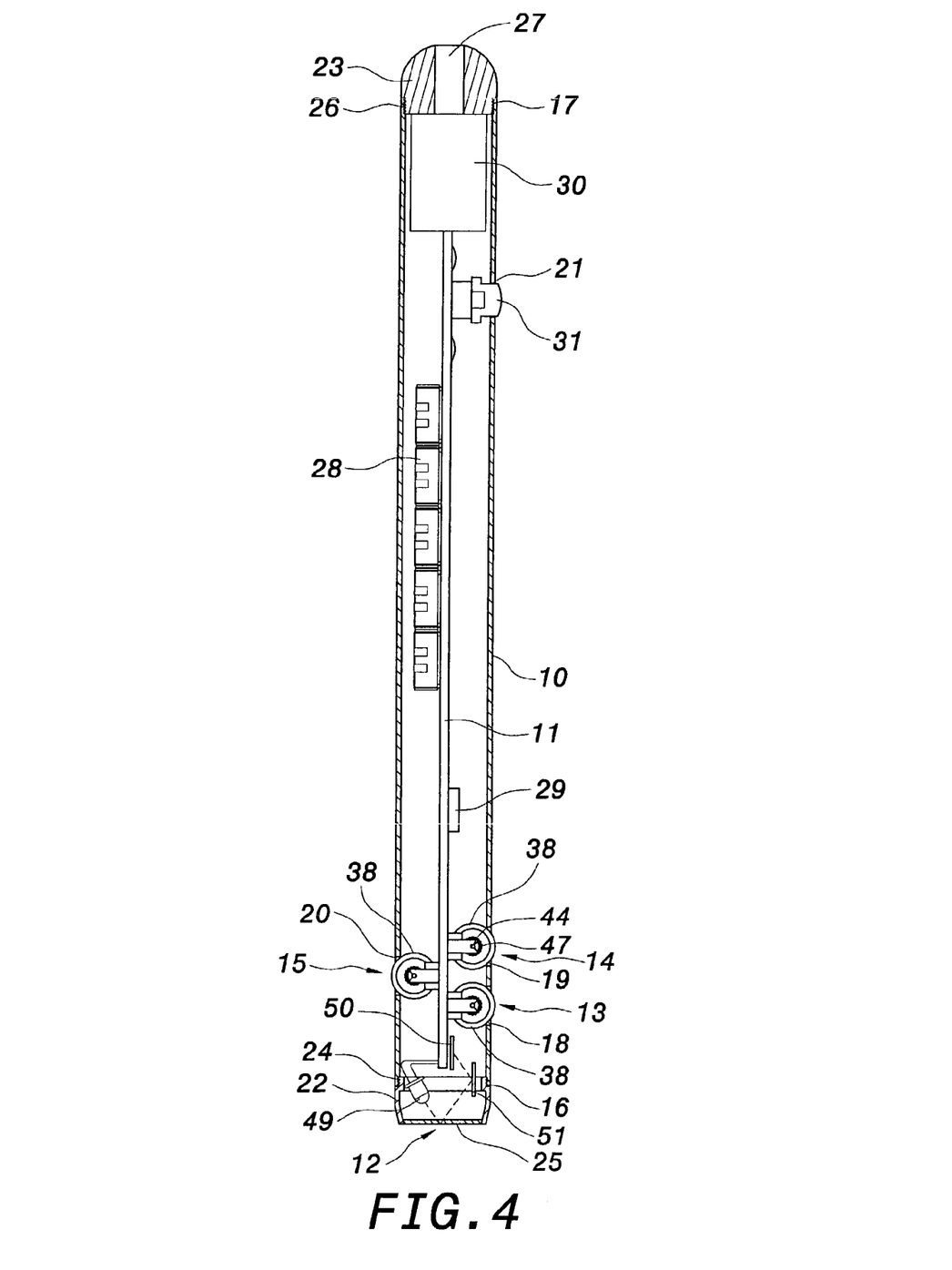
FIG. 4 is a sectional view of an alternate form of the pen base mouse according to the present invention.

Referring to FIG. 4, in addition to the aforesaid mechanical design, the cursor control unit 12 can alternatively be of a photoelectric design, comprised of an optical emitting member 49, an optical receiving member 50, and a reflector 51 spaced between the optical emitting member 49 and the optical receiving member 50. This design must be used with a specifically designed grid pad. When the light of the optical emitting member 49 emitted to the blank area of the grid pad, the grid pad reflects the light onto the optical receiving member 50, thereby causing the optical receiving member 50 to be electrically connected, and therefore a low potential is obtained from the control line. On the contrary, when the light of the optical emitting member 49 absorbed by the lines of the grid pad, the optical receiving member 50 is off, and a high potential is obtained from the control line. Therefore, a signal containing a series of high and low potentials is produced when moving the cursor control unit 12 across the grid pad. The output signal is then processed by the CPU into a corresponding digital signal indicative of the direction and amount of the pen base mouse on the grid pad.

Figure 5:
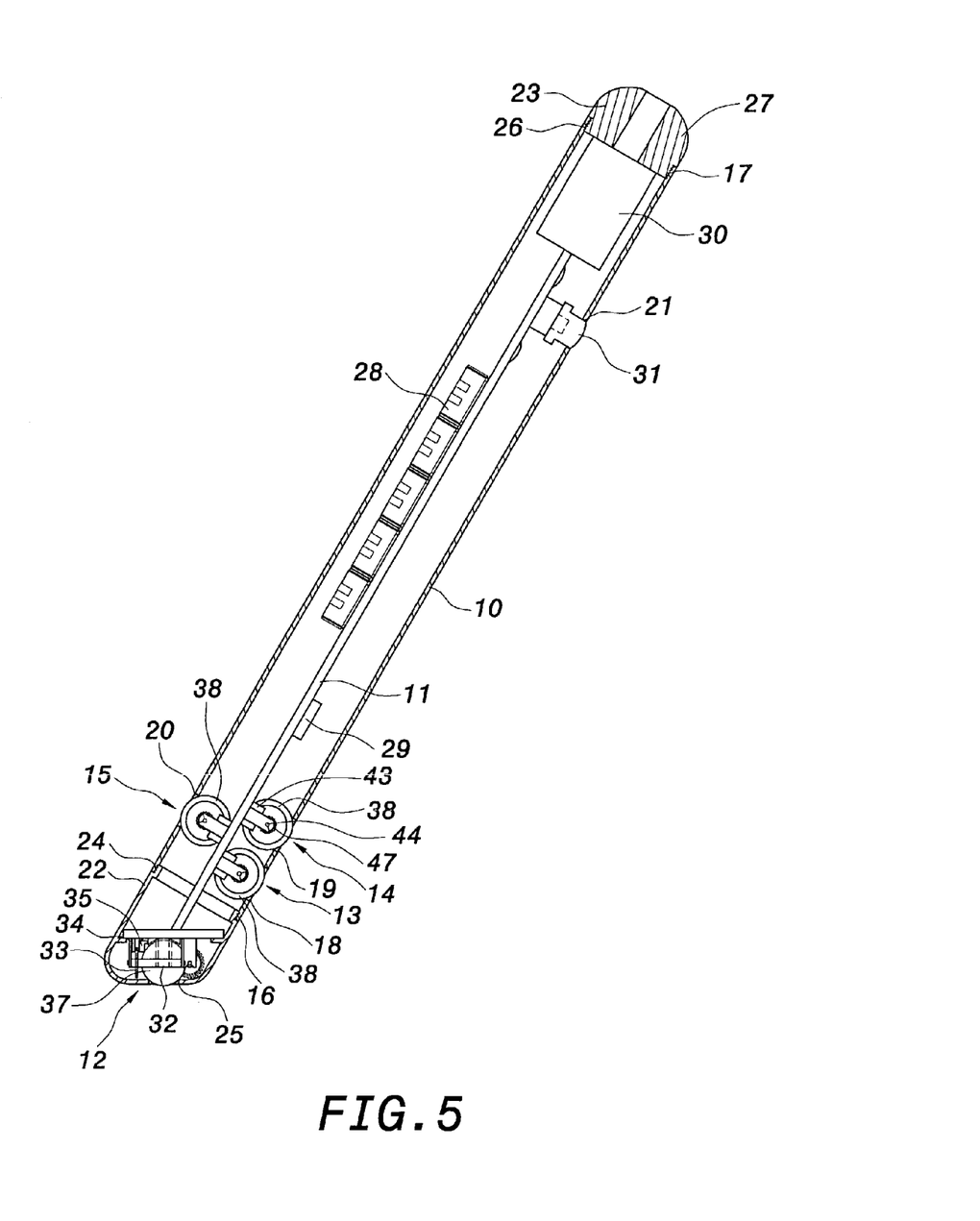
FIG. 5 is a sectional view of another alternate form of the pen base mouse according to the present invention.
Figure 6:
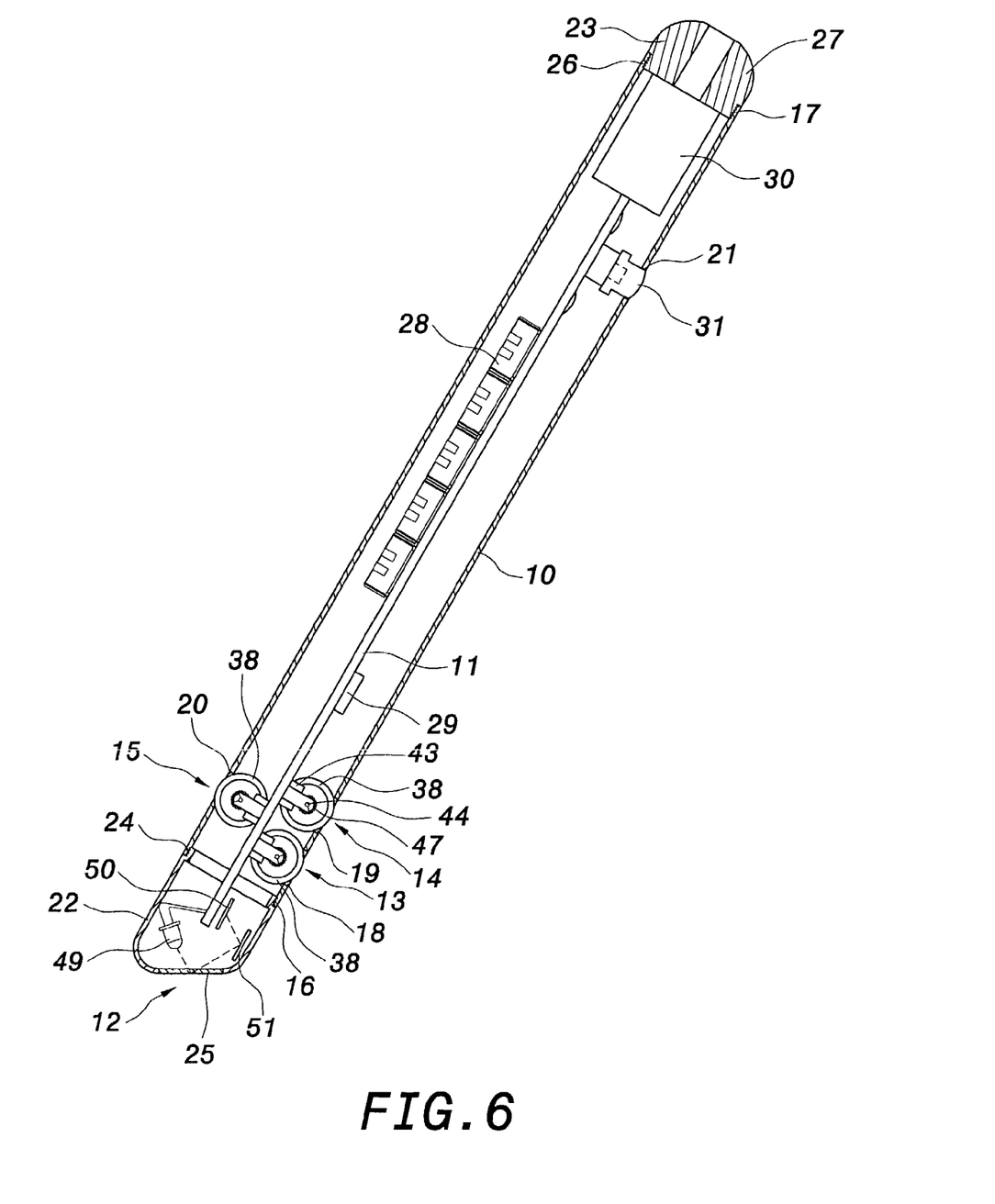
FIG. 6 is a sectional view of still another alternate form of the pen base mouse according to the present invention.

Referring to FIGS. 5 and 6, the pen base mouse can be orthopedically engineered, i.e., the front end cap 22 can be made having a beveled edge such that the pen base mouse is maintained in a tilted position when moved across a flat surface or grid pad.

Figure 7:
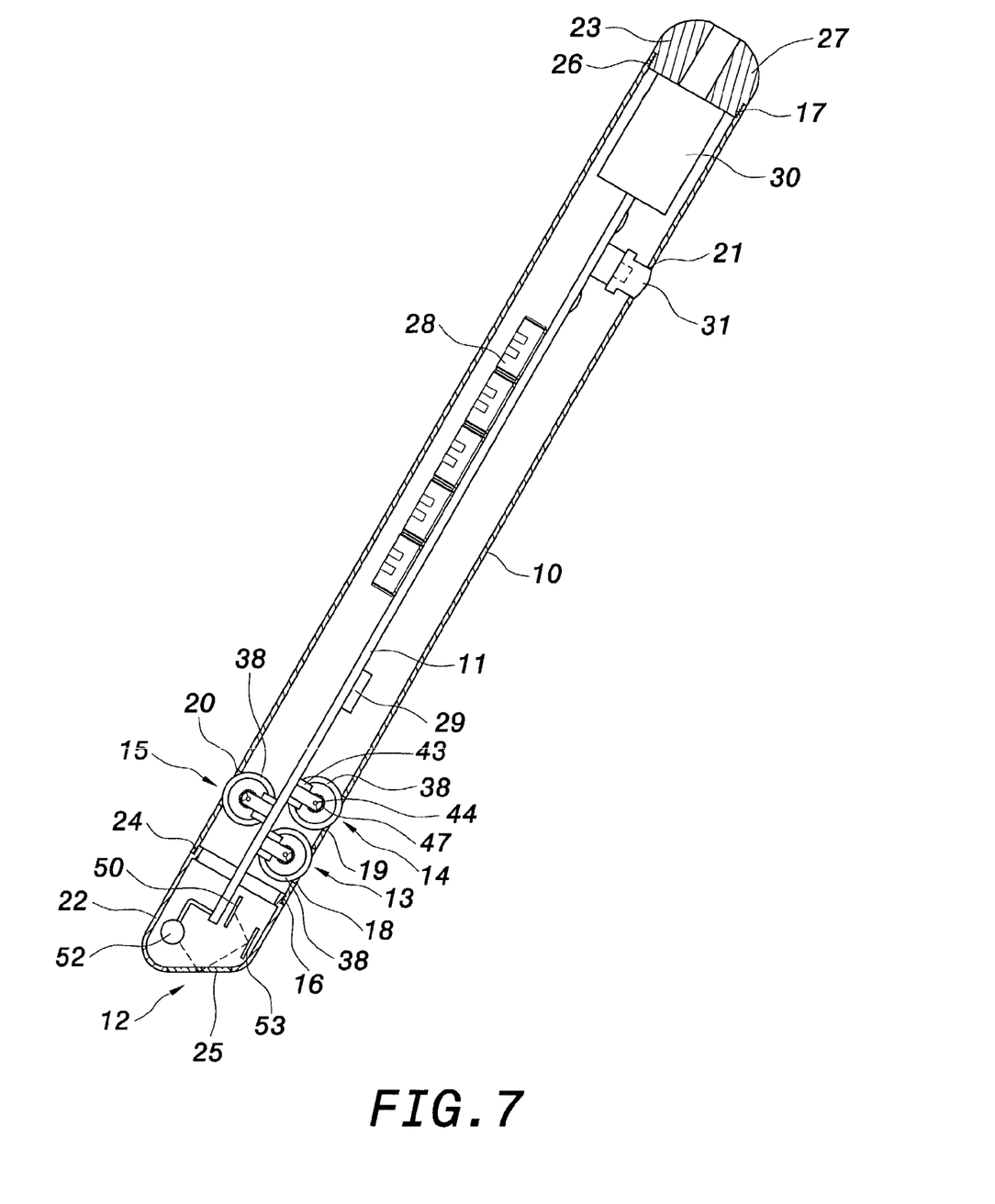
FIG. 7 is a sectional view of still another alternate form of the pen base mouse according to the present invention.

Additionally, referring to FIG. 7, the cursor control unit 12 also can be constituted by ultrasound devices, which includes ultrasound components 52 and 53.

A prototype of pen base mouse has been constructed with the features of FIGS. 1~7. The pen base mouse functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A pen-shaped mouse comprising:
   a tubular penholder, said penholder having a front and a rear end;
   a circuit board mounted inside said penholder, said circuit board including a wireless transmitter;
   a cursor control unit mounted in said front end of said penholder and electrically coupled said circuit board for movement with said penholder relative to a surface to control a pointer on a computer screen responsive to said movement;

a visible light source coupled to said circuit board to emit visible light out from said penholder through a central through hole formed at said rear end of said penholder, for illuminating an object; and three button units including a left button unit, an intermediate button unit, and a right button unit, each of said button units including a roller peripherally extended out of said penholder for rotating about an axis of said roller and for pressing in a radially inward direction with respect to said tubular penholder to produce a a plurality of first signals responsive to said rotation of said roller and a second signal responsive to said pressing of said roller for output to said circuit board.

2. The pen-shaped mouse as claimed in claim 1, wherein said penholder includes a first inner thread in said front end, and a first end cap threaded into said first inner thread and holding said cursor control unit inside said penholder, said first end cap having a center through hole corresponding to said cursor control unit.

3. The pen-shaped mouse as claimed in claim 2, wherein said penholder further includes a second inner thread in said rear end, and a second end cap threaded into said second inner thread.

4. The pen-shaped mouse as claimed in claim 3, wherein said second end cap has a center through hole; said penholder including a switch hole; said circuit board including a light source control switch extended out of said penholder through said switch hole, said visible light source being controlled by said light source switch to emit visible light out of said penholder through said center through hole of said second end cap.

5. The pen-shaped mouse as claimed in claim 1, wherein said penholder includes a first wheel hole, a second wheel hole, and a third wheel hole adapted to receive said rollers of said button units.

6. The pen-shaped mouse as claimed in claim 5, wherein said first wheel hole, said second wheel hole and said third wheel hole are respectively disposed adjacent to said front end of said penholder.

7. The pen-shaped mouse as claimed in claim 5, wherein said first wheel hole and said second wheel hole are axially aligned in a line, and said third wheel hole is disposed at one side opposite to said first wheel hole and said second wheel hole.

8. The pen-shaped mouse as claimed in claim 1, wherein said circuit board is mounted with a set of battery cells adapted to provide said pen-shaped mouse with power.

9. The pen-shaped mouse as claimed in claim 1, wherein said cursor control unit includes a rubber ball supported in said front end of said penholder and peripherally partially exposed outside said penholder for moving across a flat surface, a seat fixedly provided at one end of said circuit board, two rollers respectively pivoted to said seat and being perpendicular to each other, said rollers of said cursor control unit each having a first end disposed in contact with said periphery of said rubber ball and a second end, two grid wheels respectively fixedly mounted on said second ends of said rollers of said cursor control unit for synchronous rotation, two optical emitter and two optical receivers respectively fixedly mounted in said seat at two opposite sides of said grid wheels and electrically connected to said circuit board.

10. The pen-shaped mouse as claimed in claim 1, wherein said cursor control unit includes an optical emitter adapted to emit light onto an external grid pad, and an optical receiver adapted to receive reflected light from said grid pad onto which said light of said optical emitter is emitted.

11. The pen-shaped mouse as claimed in claim 1, wherein said three button units each further includes a shaft fixedly fastened to said roller of said respective button unit and vertically movably coupled to said circuit board, a grid wheel fixedly mounted on said respective shaft for synchronous movement with said respective roller, an optical emitter disposed at one side of said respective grid wheel, an optical receiver disposed at an opposite side of said respective grid wheel and adapted to receive light from said respective optical emitter and produce said plurality of first signals when said roller corresponding therewith is rotated, and a switch mounted on said circuit board corresponding to said respective shaft and adapted to produce said second signal when said corresponding roller is pressed down to lower said shaft.

12. The pen-shaped mouse as claimed in claim 1, wherein said cursor control unit is constituted by ultrasound devices.

13. A pen-shaped mouse comprising:

a tubular penholder, said penholder having a front and a rear end, said rear end having an internal thread formed therein;

an end cap threadedly coupled to said rear end of said penholder, said end cap having a central through hole formed therein;

a circuit board mounted inside said penholder, said circuit board including a wireless transmitter;

a cursor control unit mounted in said front end of said penholder and electrically coupled said circuit board for movement with said penholder relative to a surface to control a pointer on a computer screen responsive to said movement;

a visible light source coupled to said circuit board to emit visible light out from said penholder through said central through hole of said end cap for illuminating an object;

a light source control switch extending through an opening in said penholder, said light source control switch being coupled to said circuit board and connected to said visible light source for controlling operation of said visible light source responsive to a manual operation of said light source control switch; and, three button units including a left button unit, an intermediate button unit, and a right button unit, said button units each including a roller peripherally extending out of said penholder and being rotatable about an axis of said roller and being depressible in a radially inward with respect to said tubular penholder to produce a respective first and second signals to said circuit board.

* * * * *